| (12) | United States Patent | (10) Patent No.: | US 9,583,912 B2 |
|---|---|---|---|
| | Chou et al. | (45) Date of Patent: | Feb. 28, 2017 |

(54) COMPACT OPTICAL AND LASER SYSTEMS AND ULTRAFAST LASER UTILIZING THE SAME

(71) Applicant: HC Photonics Corp., Hsinchu (TW)

(72) Inventors: Ming-Hsien Chou, Hsinchu (TW); Ding-Yuan Chen, Hsinchu (TW)

(73) Assignee: HC Photonics Corp. (TW)

( * ) Notice: Subject to any disclaimer, the term of this patent is extended or adjusted under 35 U.S.C. 154(b) by 0 days.

(21) Appl. No.: 14/717,196

(22) Filed: May 20, 2015

(65) Prior Publication Data

US 2016/0344157 A1 Nov. 24, 2016

(51) Int. Cl.
*H01S 3/23* (2006.01)
*H01S 3/00* (2006.01)
*H01S 3/067* (2006.01)

(52) U.S. Cl.
CPC .......... *H01S 3/2308* (2013.01); *H01S 3/0057* (2013.01); *H01S 3/067* (2013.01)

(58) Field of Classification Search
CPC ....... H01S 3/2308; H01S 3/0057; H01S 3/067
See application file for complete search history.

(56) References Cited

U.S. PATENT DOCUMENTS

| 5,522,002 | A | * | 5/1996 | Chun | .................. | G02B 6/4292 |
|---|---|---|---|---|---|---|
| | | | | | | 257/433 |
| 5,864,642 | A | | 1/1999 | Chun et al. | | |
| 6,253,004 | B1 | | 6/2001 | Lee et al. | | |
| 6,328,482 | B1 | | 12/2001 | Jian | | |
| 6,767,140 | B2 | | 7/2004 | Pendse et al. | | |
| 6,845,184 | B1 | | 1/2005 | Yoshimura et al. | | |
| 7,373,033 | B2 | * | 5/2008 | Lu | .......................... | G02B 6/421 |
| | | | | | | 257/432 |
| 2002/0039464 | A1 | * | 4/2002 | Yoshimura | ............... | G02B 6/10 |
| | | | | | | 385/14 |
| 2002/0094006 | A1 | * | 7/2002 | Kasamatsu | ......... | H01S 3/09415 |
| | | | | | | 372/75 |

(Continued)

FOREIGN PATENT DOCUMENTS

WO 2013115805 A1 8/2013

OTHER PUBLICATIONS

"Ti:sapphire amplifier producing millijoule-level, 21-fs pulses at 1 kHz" by S. Backus et al, published in Optics Letters, vol. 20, Issue 19, pp. 2000-2002 (1995).

(Continued)

*Primary Examiner* — Xinning Niu
(74) *Attorney, Agent, or Firm* — Emerson, Thomson & Bennett, LLC; Roger D. Emerson

(57) ABSTRACT

A compact optical system is provided. The system includes a first optical module, a first substrate, a second optical module, and a second substrate. The first optical module is utilized to modulate a laser beam. The first substrate supports the first optical module, and the first substrate defines a first optical via such that the laser beam can pass through the first substrate through the first optical via. The second optical module receives the laser beam from the first optical via for modulating the laser beam. The second substrate is disposed parallel to the first substrate and away from the first substrate with a first predetermined distance and utilized to support the second optical module. An ultrafast laser thereof is further provided.

7 Claims, 3 Drawing Sheets

(56) References Cited

U.S. PATENT DOCUMENTS

| | | | |
|---|---|---|---|
| 2002/0118907 A1* | 8/2002 | Sugama | G02B 6/12002 385/14 |
| 2004/0126050 A1 | 7/2004 | Claydon | |
| 2007/0098025 A1 | 5/2007 | Hong et al. | |
| 2007/0278504 A1 | 12/2007 | Jasmin et al. | |
| 2010/0051972 A1 | 3/2010 | Chen | |
| 2011/0091157 A1* | 4/2011 | Yao | G02B 6/12002 385/42 |
| 2014/0334773 A1 | 11/2014 | Mathai | |

OTHER PUBLICATIONS

"A picosecond thin-rod Yb:YAG regenerative laser amplifier with the high average power of 20 W" by S Matsubara et al, published in Laser Phys. Lett. 10, 055810 (2013).

"Picosecond laser system with 30-W average power via cavity dumping and amplifying" by J. Fu et al, published in Laser Physics, vol. 21, Issue 6, pp. 1042-1046, Jun. 2011.

"Parallel optical interconnect between ceramic BGA packages on FR4 board using embedded waveguides and passive optical alignments" by Karppinen, M et al, Published in Electronic Components and Technology Conference, 2006. Proceedings. 56th (2006).

\* cited by examiner

US 9,583,912 B2

COMPACT OPTICAL AND LASER SYSTEMS AND ULTRAFAST LASER UTILIZING THE SAME

TECHNICAL FIELD OF THE INVENTION

The present invention relates to an optical system, and especially to compact optical and laser systems and a picosecond laser system being capable of reducing space usage.

BACKGROUND OF THE INVENTION

Lasers have been widely used in various fields such as industry, aesthetic medicine, scientific research, and so on. Laser construction is mainly composed of three main parts: an optical resonator, a gain medium, and an energy pumping device (usually referred to as a pumping source). As to a high power ultrashort pulse laser system such as a picosecond or femtosecond laser, it requires a greater variety of optical components for modulating a laser pulse, thereby achieving the requirements of ultra-short pulse and high power.

The conventional ultrashort pulse laser system includes multiple optical functional modules, such as a Ti:sapphire (titanium-sapphire) oscillator, a pulse stretcher, a pulse amplifier, a pulse compressor, and so on, as described, for instance, in an article by S. Backus et al, entitled "Ti:sapphire amplifier producing millijoule-level, 21-fs pulses at 1 kHz" published in Optics Letters, Vol. 20, Issue 19, pp. 2000-2002 (1995). Specifically, each optical module includes multiple optical components. For example, the multi-pass amplifier described in the article includes a gain crystal, concave mirrors, a stimulating light source, mirrors, etc. In addition, the high power picosecond laser can be generated by using a regenerative amplifier, as described in the article entitled "A picosecond thin-rod Yb:YAG regenerative laser amplifier with the high average power of 20 W" by S Matsubara et al, published in Laser Phys. Lett. 10, 055810 (2013). The regenerative amplifier includes a laser oscillator, a Pockels Cell, a polarizer, lenses, and so on.

However, because these ultrashort pulse laser systems need to take up a lot of space for setting up the above-mentioned optical modules on an optical bench, the conventional ultrashort pulse laser systems have a shortcoming of vast bulk, and hence they are difficult to commercialize. Moreover, due to the high power requirements, a large quantity of heat is produced. However, the laser oscillator is very sensitive to the temperature. The waste heat generated by the amplifier will influence the laser oscillator, and results in an unstable laser output.

SUMMARY OF THE INVENTION

Accordingly, an objective of the present invention is to provide a compact optical system, which proposes a construction of stacked multi-layers for reducing the 2D space occupancy of the ultrashort pulse laser systems, whereby the ultrashort pulse laser systems implemented by the compact optical system of the present invention can be commercialized. In addition, by means of the design of replaceable modules, the optical modules with specific functions can be replaced depending on a desired function in the compact optical system of the present invention. Therefore, functionality and the degree of freedom of the optical system can be improved.

Another objective of the present invention is to provide a compact laser system which employs three layers of stacked substrates. Optical connection between the optical modules is realized by optical vias on the substrates; hence the footprint thereof can be reduced.

Yet another objective of the present invention is to provide an ultrafast laser which disposes an amplifier having a hot spot on the third substrate and disposes a Ti:sapphire oscillator being sensitive to thermal on the first substrate. The Ti:sapphire oscillator and the amplifier are separated by the second substrate, thereby maintaining the stability of the laser output.

To achieve the foregoing objectives, according to an aspect of the present invention, the compact optical system provided in the present invention includes a first optical module, a first substrate, a second optical module, and a second substrate. The first optical module is utilized to modulate a laser beam. The first substrate supports the first optical module. The first substrate defines a first optical via (through hole) such that the laser beam can pass through the first substrate through the first optical via. The second optical module receives the laser beam from the first optical via for utilizing the laser beam. The second substrate is disposed parallel to the first substrate and away from the first substrate with a first predetermined distance, and the second substrate is utilized to support the second optical module.

In the compact optical system of one preferred embodiment, the second substrate defines a second optical via such that the laser beam can pass through the second substrate through the second optical via. Specifically, the compact optical system of the preferred embodiment further includes a third optical module and a third substrate. The third optical module receives the laser beam from the second optical via for utilizing the laser beam. The third substrate is disposed parallel to the second substrate and away from the second substrate with a second predetermined distance, and the third substrate is utilized to support the third optical module.

In the compact optical system of one preferred embodiment, the first substrate has an alignment mark, and the second substrate has a corresponding alignment mark.

In the compact optical system of one preferred embodiment, the first optical module and the first substrate form a first replaceable module, which is detachably coupled to the second substrate. The first replaceable module is one of a laser oscillator, an amplifier, a pulse stretcher, a pulse compressor, a pulse selector, a pulse cleaner, a spectrometer, and a receiver.

In the compact optical system of one preferred embodiment, the second optical module and the second substrate forms a second replaceable module, which is detachably coupled between the first substrate and the third substrate. The second replaceable module is one of a laser oscillator, an amplifier, a pulse stretcher, a pulse compressor, a pulse selector, a pulse cleaner, a spectrometer, and a receiver.

In the compact optical system of one preferred embodiment, the third optical module and the third substrate forms a third replaceable module, which is detachably coupled to the second substrate. The third replaceable module is one of a laser oscillator, an amplifier, a pulse stretcher, a pulse compressor, a pulse selector, a pulse cleaner, a spectrometer, and a receiver.

In the compact optical system of one preferred embodiment, the laser beam has a plurality of paths which are substantially parallel to the first substrate and the second substrate in the first optical module and the second optical module. Furthermore, the laser beam passes through at least three optical components respectively in the first optical module and the second optical module.

In the compact optical system of one preferred embodiment, the first predetermined distance is between 10 microns and 50 centimeters.

In the compact optical system of one preferred embodiment, a plurality of thermal vias and a plurality of electrical vias are defined by the first substrate and/or the second substrate.

In the compact optical system of one preferred embodiment, the compact optical system is a solid-state laser or a fiber laser.

To achieve the foregoing objectives, according to another aspect of the present invention, the compact laser system provided in the present invention includes a first optical module, a first substrate, a second optical module, a second substrate, a third optical module, and a third substrate. The first optical module is utilized to modulate a laser beam. The first substrate supports the first optical module. The first substrate defines a first optical via such that the laser beam can pass through the first substrate through the first optical via. The second optical module receives the laser beam from the first optical via for utilizing the laser beam. The second substrate is disposed parallel to the first substrate and away from the first substrate with a first predetermined distance, and utilized to support the second optical module. The second substrate defines a second optical via such that the laser beam can pass through the second substrate through the second optical via. The third optical module receives the laser beam from the second optical via for utilizing the laser beam. The third substrate is disposed parallel to the second substrate and away from the second substrate with a second predetermined distance, and utilized to support the third optical module.

In the compact laser system of one preferred embodiment, the first substrate, the second substrate, and the third substrate respectively have a first alignment mark, second alignment mark, and a third alignment mark for aligning the first substrate, the second substrate, and the third substrate.

In the compact laser system of one preferred embodiment, the first predetermined distance and the second predetermined distance are between 10 microns and 50 centimeters.

In the compact laser system of one preferred embodiment, the first optical module and the first substrate form a first replaceable module, which is detachably coupled to the second substrate. The second optical module and the second substrate form a second replaceable module, which is detachably coupled between the first substrate and the third substrate.

To achieve the foregoing objectives, according to an aspect of the present invention, the ultrafast laser provided in the present invention includes a first optical module, a first substrate, a second optical module, a second substrate, a third optical module, and a third substrate. The first optical module utilized to generate a laser pulse. The first substrate supports the first optical module. The first substrate defines a first optical via such that the laser pulse can pass through the first substrate through the first optical via. The second optical module receives the laser pulse from the first optical via for stretching the laser pulse. The second substrate is disposed parallel to the first substrate and away from the first substrate with a first predetermined distance and utilized to support the second optical module. The second substrate defines a second optical via such that the laser pulse can pass through the second substrate through the second optical via. The third optical module receives the laser pulse from the second optical via for amplifying the stretched laser pulse.

The third substrate is disposed parallel to the second substrate and away from the second substrate with a second predetermined distance, and utilized to support the third optical module. The amplified laser pulse goes back to the second optical module through a third optical via disposed on the second substrate, and the second optical module is further utilized to compress the amplified laser pulse for generating a ultrafast laser output.

In the ultrafast laser of one preferred embodiment, the first optical module comprises a solid-state or fiber-based oscillator; the second optical module comprises a pulse stretcher and a pulse compressor; the third optical module comprises an amplifier.

In the ultrafast laser of one preferred embodiment, the first substrate, the second substrate, and the third substrate respectively have a first alignment mark, second alignment mark, and a third alignment mark for aligning the first substrate, the second substrate, and the third substrate.

In the ultrafast laser of one preferred embodiment, the third substrate defines a plurality of thermal vias and a plurality of electrical vias.

In comparison with the prior art, the present invention employs the substrates having the optical vias. The optical components that occupy a large area are stacked in multi-layers, whereby the shortcoming of bulky space occupancy in the conventional ultrashort pulse laser systems can be overcome, further achieving the objective of commercialization.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
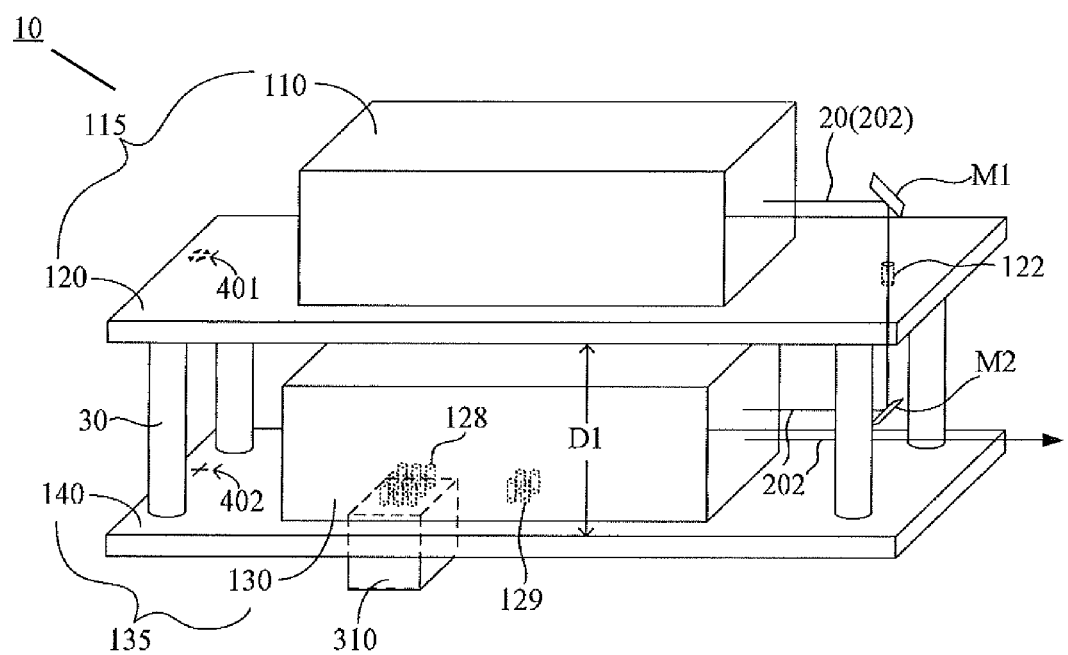
FIG. 1 is a perspective view schematically illustrating a compact optical system according to a first preferred embodiment of the present invention.

The present invention will now be described in detail with reference to several preferred embodiments thereof as illustrated in the accompanying drawings. The same reference numerals refer to the same parts or like parts throughout the various figures.

Referring to FIG. 1, FIG. 1 is a perspective view schematically illustrating a compact optical system according to a first preferred embodiment of the present invention. The compact optical system 10 of the preferred embodiment is used for a laser system, and especially to an ultrashort pulse solid-state laser or a fiber laser whose gain medium is a fiber. However, the present invention is not limited thereto. For example, applications that require a reduced footprint, such as laser range finders, optical communication systems, and so on are also within the scope of the present invention. The compact optical system 10 of the embodiment includes a first optical module 110, a first substrate 120, a second optical module 130, and a second substrate 140.

As shown in FIG. 1, the first optical module 110 is utilized to modulate a laser beam 20. Specifically, the first optical module 110 includes a plurality of optical components (not shown for clarity), e.g. mirrors, lenses, polarizers, a gain media, and a saturable absorber. The optical components are mounted on the first substrate 120, so as to form the optical module with a specific functionality. Specifically, the first optical module 110 and the first substrate 120 form a first replaceable module 115. The first replaceable module 115 is detachably coupled to the second substrate 140. Preferably, the first replaceable module 115 is one of a laser oscillator, an amplifier, a pulse stretcher, a pulse compressor, a pulse selector, a pulse cleaner, a spectrometer (spectrophotometer, spectrograph or spectroscope), and a receiver. Each of these (i.e., laser oscillators, amplifiers, pulse stretchers, pulse compressors, pulse selectors, pulse cleaners, spectrometers, and receivers) are well-known to a person skilled in the art, so no further details will be provided herein. In addition, the spectrometer may include fixed-gratings, single-photon avalanche diodes (SPADs), CCDs (Charge Coupled Devices), motors, and so on.

The first substrate 120 supports the first optical module 110, and the first substrate 120 defines a first optical via 122 such that the laser beam 20 can pass through the first substrate 120 through the first optical via 122. In the embodiment, the first substrate 120 can be made of ceramic or silicon, even a printed circuit board (PCB). Preferably, the first substrate 120 is made of Low-Temperature Cofired Ceramics (LTCC). Also, the aperture of the first optical via 122 is between 0.1 mm and 50 mm.

As shown in FIG. 1, the second optical module 130 receives the laser beam 20 from the first optical via 122 and is utilized to utilize the laser beam 20. Similarly, the second optical module 130 includes a plurality of optical components (not shown for clarity), e.g. mirrors, lenses, polarizers, a gain media, and a saturable absorber. The optical components are mounted on the second substrate 140, so as to form the optical module with a specific functionality. Similarly, the second substrate 140 is utilized to support the second optical module 130. More specifically, the laser beam 20 has a plurality of paths 202. The paths 202 in the first optical module 110 and the second optical module 130 are substantially parallel to the first substrate 120 and the second substrate 140. Furthermore, the laser beam 20 passes through at least three optical components (e.g. lenses, mirrors, gain media, gratings, prisms, or polarizers) respectively in the first optical module 110 and the second optical module 130. Optical coupling between the first optical module 110 and the second optical module 130 is realized by two 45 degree mirrors M1 and M2 which are respectively disposed on the first substrate 120 and the second substrate 140 for reflecting the laser beam 20 to vertically pass through the first optical via 122. Similarly, the second substrate 140 can be made of ceramic or silicon, even the PCB. Preferably, the second substrate 140 is made of LTCC.

The second substrate 140 is disposed parallel to the first substrate 120 and away from the first substrate 120 with a first predetermined distance D1 between the second substrate 140 and the first substrate 120. In the embodiment, the first predetermined distance D1 is between 10 microns and 50 centimeters. It is worth mentioning that the second substrate 140 and first substrate 120 are equipped with a plurality of supporting pillars 30 therebetween. The supporting pillars 30 are fastened between the second substrate 140 and first substrate 120 by bolts and nuts (not shown). Moreover, in order to align the upper and the lower substrates for ensuring the accuracy of the laser beam path 20, the first substrate 120 has an alignment mark 401, and the second substrate 140 has a corresponding alignment mark 402. During the assembly process, the alignment mark 401 and the corresponding alignment mark 402 can be aligned, thereby ensuring the alignment between the first substrate 120 and the second substrate 140. It should be noted that specific patterns of the alignment mark 401 and the corresponding alignment mark 402 are not limited in the present invention.

Similarly, the second optical module 130 and the second substrate 140 form a second replaceable module 135, which is detachably coupled to the first substrate 120. The second replaceable module 135 can be one of a laser oscillator, an amplifier, a pulse stretcher, a pulse compressor, a pulse selector, a pulse cleaner, a spectrometer, and a receiver. For example, if the second replaceable module 135 is an amplifier with a heat source, the second substrate 140 further defines a plurality of thermal vias 128 and is equipped with a heat sink 310 for thermal management. In addition, the second substrate 140 can also define a plurality of electrical vias 129. The electrical vias 129 are utilized to electrically couple to the components (e.g., Pockels cell and receiver) within the second optical module 130. However, in other embodiments, the first substrate 120 can also define the plurality of thermal vias 128 and electrical vias 129. It is worth mentioning that the compact optical system 10 of the embodiment further includes a housing (not shown) for protecting the optical components within the optical modules.

In accordance with the above-mentioned embodiment, a large number of the optical components can be distributed on the two stacked substrates, so that the 2D space occupancy of the laser system can be reduced. However, the present invention does not limit the number of substrates. For example, three, four or more stacked substrates are also within the scope of the present invention.

Figure 2:
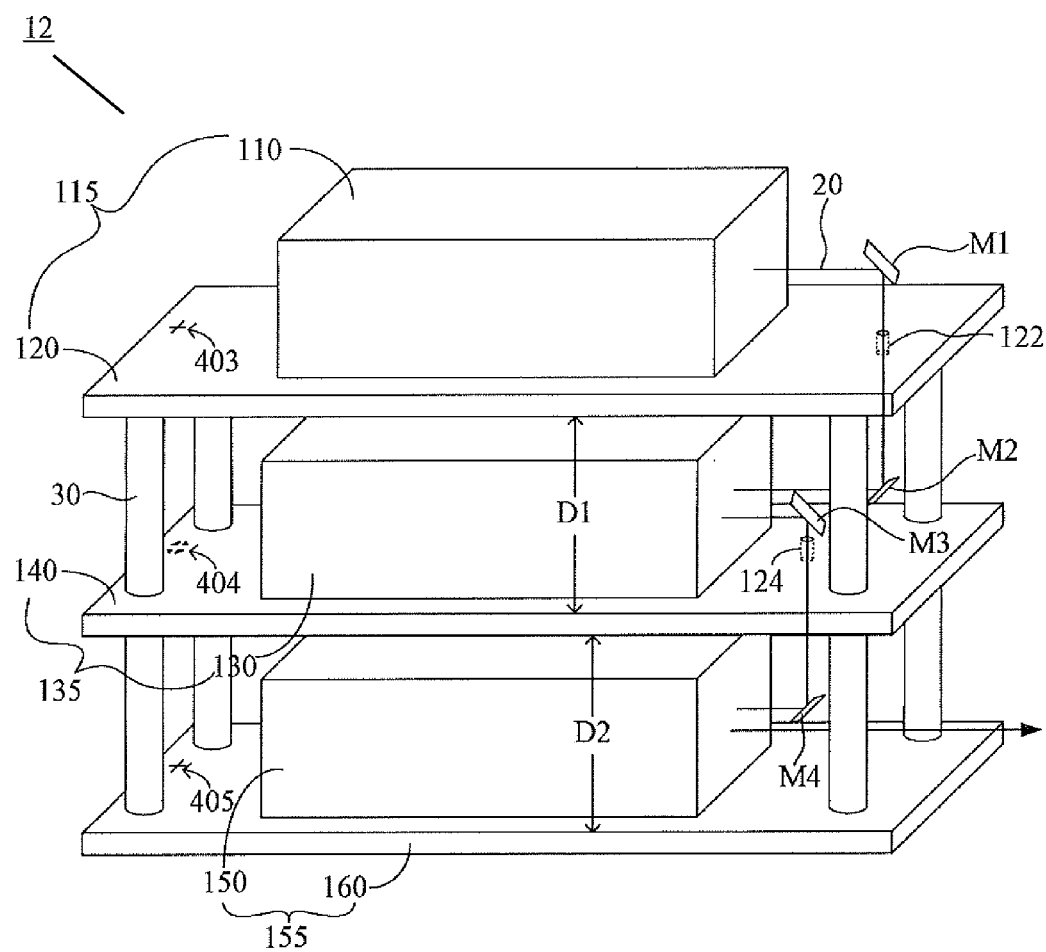
FIG. 2 is a perspective view schematically illustrating a compact laser system according to a second preferred embodiment of the present invention.

The following will explain a second preferred embodiment of the present invention in detail. The compact laser system of the embodiment is implemented by the above-mentioned compact optical system and the descriptions of the following elements have been explained as mentioned above, so we need not go into detail herein. Referring to FIG. 2, FIG. 2 is a perspective view schematically illustrating a compact laser system according to a second preferred embodiment of the present invention. The compact laser system 12 of the embodiment includes a first optical module 110, a first substrate 120, a second optical module 130, a second substrate 140, a third optical module 150, and a third substrate 160.

As shown in FIG. 2, the first optical module 110 is utilized to modulate a laser beam 20. The first substrate 120 supports the first optical module 110, and the first substrate 120 defines a first optical via 122 such that the laser beam 20 can pass through the first substrate 120 through the first optical via 122. Similarly, the first optical module 110 and the first substrate 120 form a first replaceable module 115. The first replaceable module 115 is detachably coupled to the second substrate 140. In the compact laser system 12 of the preferred embodiment, the first replaceable module 115 is one of a laser oscillator, an amplifier, a pulse stretcher, a pulse compressor, a pulse selector, a pulse cleaner, and a spectrometer.

Similarly, the second optical module 130 receives the laser beam 20 from the first optical via 122, and is utilized to utilize the laser beam 20. The second substrate 140 is disposed parallel to the first substrate 120 and away from the first substrate 120 with a first predetermined distance D1 therebetween, and the second substrate 140 is utilized the second optical module 130. One difference from the first embodiment is that the second substrate 140 defines a second optical via 124 such that the laser beam 20 can pass through the second substrate 140 through the second optical via 124. In the embodiment, the first optical via 122 does not vertically align with the second optical via 124. However, in other embodiments, the first optical via 122 may vertically align with the second optical via 124. The optical coupling between the first optical module 110 and the second optical module 130 is realized by two 45 degree mirrors M1 and M2 which are respectively disposed on the first substrate 120 and the second substrate 140 for reflecting the laser beam 20 to vertically pass through the first optical via 122. Similarly, the second optical module 130 and the second substrate 140 form the second replaceable module 135. The second replaceable module 135 is detachably coupled between the first substrate 120 and the third substrate 160. Moreover, the second replaceable module 135 is one of a laser oscillator, an amplifier, a pulse stretcher, a pulse compressor, a pulse selector, a pulse cleaner, and a spectrometer.

As shown in FIG. 2, the third optical module 150 receives the laser beam 20 from the second optical via 124 for utilizing the laser beam 20. The third substrate 160 is disposed parallel to the second substrate 140 and away from the second substrate 140 with a second predetermined distance D2 for supporting the third optical module 150. The optical coupling between the second optical module 130 and the third optical module 150 is realized by two 45 degree mirrors M3 and M4 which are respectively disposed on the second substrate 140 and the third substrate 160 for reflecting the laser beam 20 to vertically pass through the second optical via 124. Similarly, the third optical module 150 and the third substrate 160 form a third replaceable module 155. The third replaceable module 155 is detachably coupled to the second substrate 140. Similarly, the third replaceable module 155 is one of a laser oscillator, an amplifier, a pulse stretcher, a pulse compressor, a pulse selector, a pulse cleaner, and a spectrometer.

It is worth mentioning that the first substrate 120, the second substrate 140, and the third substrate 160 respectively have a first alignment mark 403, a second alignment mark 404, and a third alignment mark 405 for aligning the first substrate 120, the second substrate 140, and the third substrate 160. In addition, the first substrate 120, the second substrate 140, and the third substrate 160 are equipped with the plurality of supporting pillars 30 therebetween. Similarly, the first predetermined distance D1 and the second predetermined distance D2 are between 10 microns and 50 centimeters. Heights of the first substrate 120 and the second substrate 140 can be determined based on the heights of the optical components within the second optical module 130 and the third optical module 150. Similarly, the plurality of thermal vias 128 and electrical vias 129 (see FIG. 1) are defined by the first substrate 120 and/or the second substrate 140 and/or the third substrate 160, and no further detail will be provided herein. It is worth mentioning that the compact laser system 12 of the embodiment further includes a housing (not shown) for protecting the optical components within the optical modules.

The following will explain a third preferred embodiment of the present invention in detail. The ultrafast laser of the embodiment is implemented by the above-mentioned compact laser system, and the descriptions of the following elements have been explained as mentioned above, so we need not go into detail herein. More specifically, the ultrafast laser can be a picosecond laser or a femtosecond laser.

Figure 3:
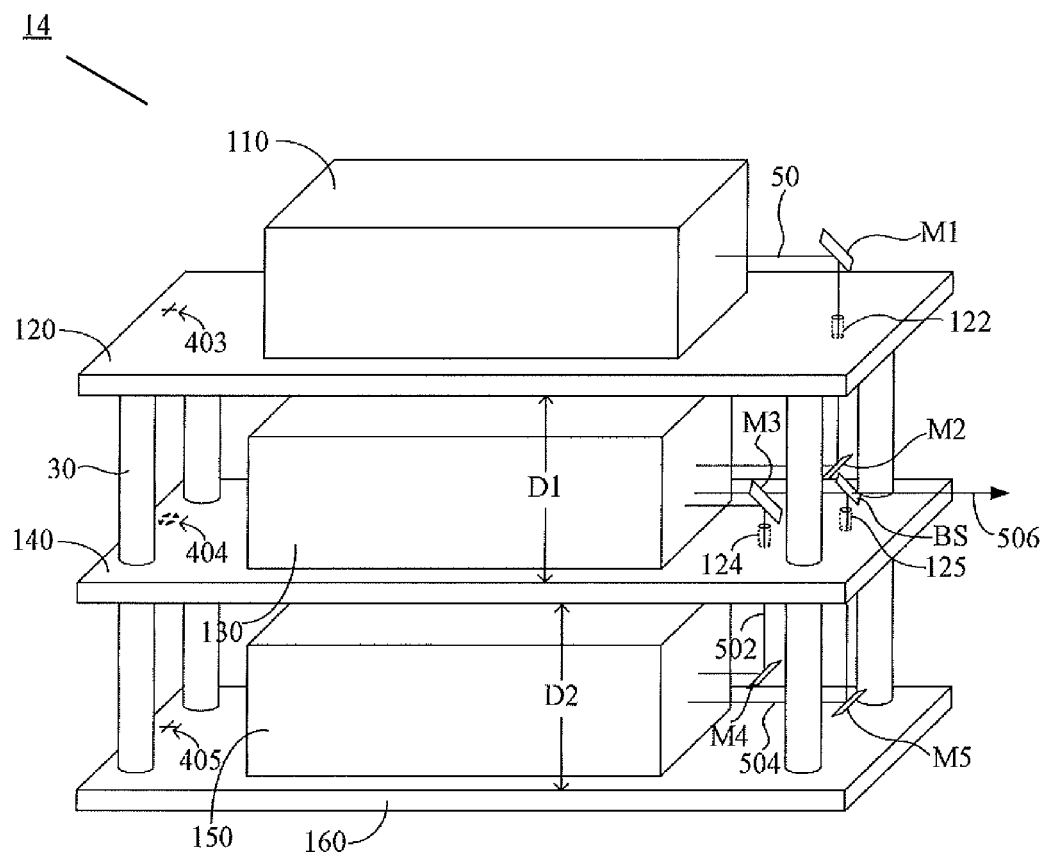
FIG. 3 is a perspective view schematically illustrating an ultrafast laser according to a third preferred embodiment of the present invention.

Referring to FIG. 3, FIG. 3 is a perspective view schematically illustrating an ultrafast laser according to a third preferred embodiment of the present invention. The ultrafast laser 14 of the embodiment includes a first optical module 110, a first substrate 120, a second optical module 130, a second substrate 140, a third optical module 150, and a third substrate 160.

As shown in FIG. 3, the first optical module 110 utilized to generate a laser pulse 50. For instance, the first optical module 110 includes a solid-state or fiber-based oscillator. In the embodiment, the first optical module 110 is a Ti:sapphire oscillator. Furthermore, the Ti:sapphire oscillator can be a Kerr-lens mode-locked Ti: sapphire oscillator, which consists of a Ti:sapphire crystal, an oscillator, lenses, mirrors, etc. (not shown for clarity) being well-known to a person skilled in the art. The first substrate 120 supports the first optical module 110, and the first substrate 120 defines a first optical via 122 such that the laser pulse 50 can pass through the first substrate 120 through the first optical via 122.

The second optical module 130 receives the laser pulse 50 from the first optical via 122 for stretching the laser pulse 50. For example, the second optical module 130 includes a pulse stretcher and a pulse compressor, in which the pulse stretcher is utilized to stretch the laser pulse 50. Specifically, the pulse stretcher includes a grating, spherical mirrors, etc. (not shown for clarity) which are well-known to a person skilled in the art. The second substrate 140 is disposed parallel to the first substrate 120 and away from the first substrate 120 with a first predetermined distance D1 therebetween, and the second substrate 140 is utilized to support the second optical module 130. The second substrate 140 defines a second optical via 124 and a third optical via 125 such that the laser pulse 50 can pass through the second substrate 140 through the second optical via 124.

The third optical module 150 receives the laser pulse 50 from the second optical via 124 for amplifying the stretched laser pulse 502. For example, the third optical module 150 includes an amplifier. Specifically, the amplifier includes a regenerative amplifier or a multi-pass amplifier. The regenerative amplifier includes a Ti:sapphire crystal, a Pockels cell, polarizers, a resonator, a Faraday rotator, etc. (not shown for clarity) being well-known to a person skilled in the art. The multi-pass amplifier includes a crystal, mirrors, concave mirrors, etc. (not shown for clarity) which are well-known to a person skilled in the art. The third substrate 160 is disposed parallel to the second substrate 140 and away from the second substrate 140 with a second predetermined distance D2 therebetween, and the third substrate 160 is utilized to support the third optical module 150. It is worth mentioning that the amplifier utilized as the third optical module 150 has a hot spot (crystal). Thus, the third substrate 160 further defines a plurality of thermal vias 128 and a plurality of electrical vias 129 (as shown in FIG. 1). Accordingly, the Ti:sapphire oscillator of the first optical module 110, being sensitive to thermal, is separated from the amplifier of the third optical module 150 by the second optical module 130 which doesn't generate heat, and hence the laser output can maintain stability.

After the amplification, the amplified laser pulse 504 goes back to the second optical module 130 through the third optical via 125 that is disposed on the second substrate 140. Specifically, the amplified laser pulse 504 goes back to the second optical module 130 through a 45 degree mirror M5 and a beam splitter. The second optical module 130 is further utilized to compress the amplified laser pulse 504 for generating a picoseconds or femtosecond laser output 506. Specifically, the amplified laser pulse 504 goes back to the pulse compressor of the second optical module 130 through the third optical via 125, and the pulse is compressed into a pulse having an ultrashort pulse duration and an extremely high peak power and then output from the beam splitter. Specifically, the pulse compressor includes gratings, mirrors, etc. (not shown for clarity) which are well-known to a person skilled in the art.

Similarly, as shown in FIG. 3, the first substrate 120, the second substrate 140, and the third substrate 160 respectively have a first alignment mark 403, a second alignment mark 404, and a third alignment mark 405 for aligning the first substrate 120, the second substrate 140, and the third substrate 160. Similarly, the first substrate 120, the second substrate 140, and the third substrate 160 are equipped with the plurality of supporting pillars 30 therebetween. It is worth mentioning that the ultrafast laser 14 of the embodiment further includes a housing (not shown) for protecting the optical components within the optical modules.

In summary, the present invention employs the substrates having the optical vias. The optical components that occupy the large area are stacked in the multi-layers, whereby the shortcoming of the bulky space occupancy in the conventional ultrashort pulse laser systems can be overcome, further achieving the objective of commercialization.

While the preferred embodiments of the present invention have been illustrated and described in detail, various modifications and alterations can be made by persons skilled in this art. The embodiment of the present invention is therefore described in an illustrative but not restrictive sense.

What is claimed is:

1. An ultrafast laser, comprising:
   a first optical module utilized to generate a laser pulse;
   a first substrate supporting the first optical module, the first substrate defining a first optical via such that the laser pulse can pass through the first substrate through the first optical via;
   a second optical module receiving the laser pulse from the first optical via for stretching the laser pulse;
   a second substrate disposed parallel to the first substrate and away from the first substrate with a first predetermined distance and utilized to support the second optical module, the second substrate defining a second optical via such that the laser pulse can pass through the second substrate through the second optical via;
   a third optical module receiving the laser pulse from the second optical via for amplifying the stretched laser pulse; and
   a third substrate disposed parallel to the second substrate and away from the second substrate with a second predetermined distance and utilized to support the third optical module;
   wherein the amplified laser pulse goes back to the second optical module through a third optical via disposed on the second substrate, and wherein the second optical module is further utilized to compress the amplified laser pulse for generating a picosecond or femtosecond laser output.

2. The ultrafast laser of claim 1, wherein the first substrate, the second substrate, and the third substrate respectively have a first alignment mark, a second alignment mark, and a third alignment mark for aligning the first substrate, the second substrate, and the third substrate.

3. The ultrafast laser of claim 1, wherein the first optical module and the first substrate form a first replaceable module, which is detachably coupled to the second substrate, and wherein the second optical module and the second substrate form a second replaceable module, which is detachably coupled between the first substrate and the third substrate.

4. The ultrafast laser of claim 1, wherein the laser pulse has a plurality of paths which are substantially parallel to the first substrate, the second substrate, and the third substrate.

5. The ultrafast laser of claim 1, wherein the first predetermined distance and the second predetermined distance are between 10 microns and 50 centimeters.

6. The ultrafast laser of claim 1, wherein a plurality of thermal vias and a plurality of electrical vias are defined by the third substrate.

7. The ultrafast laser of claim 1, wherein the first optical module comprises a solid-state or fiber-based oscillator; the second optical module comprises a pulse stretcher and a pulse compressor; the third optical module comprises an amplifier.

* * * * *